United States Patent
Chaturvedi et al.

(10) Patent No.: US 9,710,400 B2
(45) Date of Patent: Jul. 18, 2017

(54) SECURE VIRTUAL MACHINE MEMORY

(71) Applicant: Micro Focus Software Inc., Provo, UT (US)

(72) Inventors: Pradeep Kumar Chaturvedi, Bangalore (IN); Gosukonda Naga Venkata Satya Sudhakar, Bangalore (IN)

(73) Assignee: Micro Focus Software Inc., Provo, UT (US)

( * ) Notice: Subject to any disclaimer, the term of this patent is extended or adjusted under 35 U.S.C. 154(b) by 195 days.

(21) Appl. No.: 14/148,088

(22) Filed: Jan. 6, 2014

(65) Prior Publication Data

US 2014/0164791 A1    Jun. 12, 2014

Related U.S. Application Data

(62) Division of application No. 12/749,881, filed on Mar. 30, 2010, now Pat. No. 8,627,112.

(51) Int. Cl.
| | |
|---|---|
| *G06F 11/30* | (2006.01) |
| *G06F 12/14* | (2006.01) |
| *G06F 9/455* | (2006.01) |
| *G06F 21/53* | (2013.01) |

(52) U.S. Cl.
CPC ...... *G06F 12/1408* (2013.01); *G06F 9/45558* (2013.01); *G06F 21/53* (2013.01)

(58) Field of Classification Search
USPC ........................................................ 713/193
See application file for complete search history.

(56) References Cited

U.S. PATENT DOCUMENTS

| | | | |
|---|---|---|---|
| 6,892,383 | B1 | 5/2005 | Arndt |
| 7,260,820 | B1 | 8/2007 | Waldspurger et al. |
| 8,627,112 | B2 | 1/2014 | Chaturvedi et al. |
| 9,274,974 | B1* | 3/2016 | Chen .................... G06F 12/109 |
| 2005/0257048 | A1* | 11/2005 | Willman ....................... 713/165 |
| 2006/0294519 | A1* | 12/2006 | Hattori et al. .................... 718/1 |
| 2007/0106986 | A1 | 5/2007 | Worley, Jr. |
| 2007/0283169 | A1* | 12/2007 | Locker et al. ................. 713/193 |
| 2007/0294496 | A1* | 12/2007 | Goss et al. .................... 711/163 |
| 2008/0244292 | A1* | 10/2008 | Kumar et al. ................. 713/323 |
| 2009/0063806 | A1 | 3/2009 | Logan et al. |
| 2009/0113110 | A1* | 4/2009 | Chen .................... G06F 9/4426 |
| | | | 711/6 |
| 2009/0132804 | A1* | 5/2009 | Paul et al. ..................... 713/150 |
| 2009/0214040 | A1* | 8/2009 | Funk et al. .................... 380/277 |
| 2009/0228673 | A1* | 9/2009 | Waters et al. ................. 711/163 |
| 2009/0240953 | A1* | 9/2009 | Paul .............................. 713/193 |
| 2009/0282266 | A1 | 11/2009 | Fries et al. |

(Continued)

*Primary Examiner* — Christopher Revak
*Assistant Examiner* — Vadim Savenkov
(74) *Attorney, Agent, or Firm* — Schwegman Lundberg & Woessner, P.A.

(57) ABSTRACT

Apparatus, systems, and methods may operate to restore an operational state of an associated virtual machine (VM) using encrypted information stored in encrypted memory locations. A single hypervisor may be used to encrypt and decrypt the information. Access may be permitted to a designated number of the encrypted memory locations only to a single application executed by the associated VM subject to the hypervisor. Access may be denied to any other application executed by the associated VM, or any other VM.

12 Claims, 4 Drawing Sheets

(56) References Cited

U.S. PATENT DOCUMENTS

2009/0323941 A1 12/2009 Sahita et al.
2010/0223613 A1* 9/2010 Schneider ........... G06F 9/45558
                                                                 718/1
2011/0246767 A1 10/2011 Chaturvedi et al.

* cited by examiner

SECURE VIRTUAL MACHINE MEMORY

CROSS-REFERENCE TO RELATED APPLICATIONS

This application claims priority to U.S. patent application Ser. No. 12/749,881, filed on Mar. 30, 2010 and issued as U.S. Pat. No. 8,627,112, which is incorporated herein by reference in its entirety.

BACKGROUND

As the virtualization of information technology infrastructure increases, so does the amount of storage space that is used. This trend may accelerate with the implementation of various cloud-computing scenarios. Indeed, the ease of virtualization tends to lure administrators into creating any number of virtual machines (VMs) without careful consideration of the amount and type of disk space that might be needed. As a result, the security of access to memory that has been allocated to a particular VM may be compromised.

For example, in a virtualized environment, VMs often manage sensitive information in main memory during the execution of software applications. Such information includes passwords, private keys, session keys, secrets, and certificates. In addition, hypervisors provide the ability to take snapshots of memory, and to clone or suspend the operation of the VM. As a result, VM memory is frequently stored on the hard disk as a file, which persists on the disk in a format that is understood by the hypervisor. Storing sensitive information on the disk in this manner may give rise to a variety of security threats. Some attempts have been made to solve this problem, but they are hardware-specific, and do not readily apply to the virtual processing environment.

SUMMARY

In various embodiments, apparatus, systems, and methods that support secure access to VM memory are provided. For example, in some embodiments, access to memory is secured by allocating encrypted memory locations to store encrypted information, wherein the information is encrypted and decrypted using a single hypervisor. Access to a designated number of the encrypted memory locations can be permitted to a single application executed by an associated VM subject to the hypervisor. Access to the designated number of the encrypted memory locations can be denied to any other application executed by the associated VM, or any other VM.

In some embodiments, access to the associated VM memory is secured by restoring the operational state of an associated VM using encrypted information stored in encrypted memory locations, the information again being encrypted and decrypted using a single hypervisor. Further activity includes providing access (and denying access) as described previously. Additional embodiments are described, and along with the foregoing examples, will be set forth in detail below.

DETAILED DESCRIPTION

Figure 1:
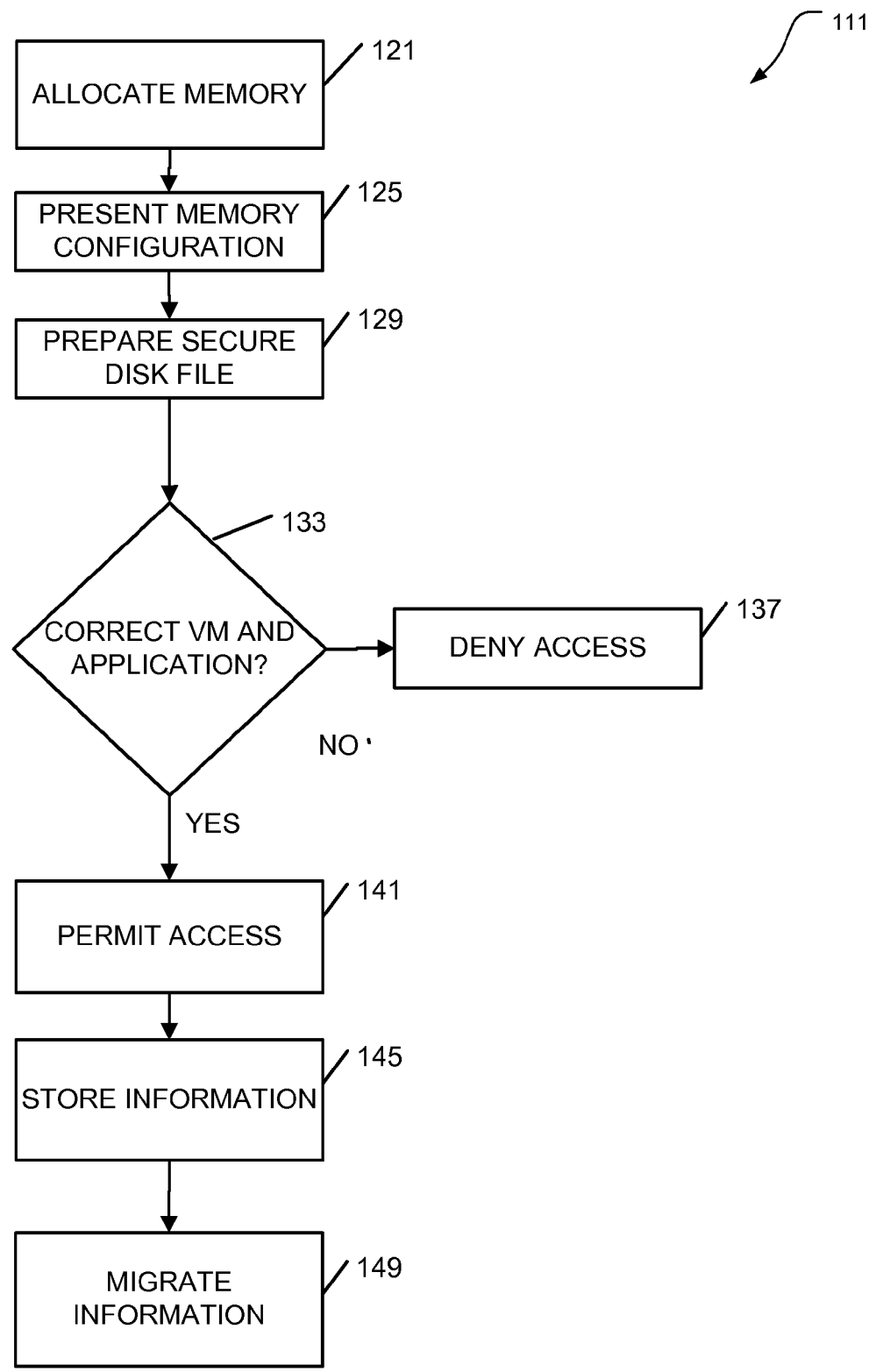
FIG. 1 is a flow diagram illustrating methods of securing access to virtual machine memory according to various embodiments of the invention.

To address some of the issues raised when secure access to memory in a virtual environment is desired, it can be noted that hypervisors have the ability to maintain a file designated as non-volatile random access memory (NVRAM). This memory can be presented VMs for their use. In various embodiments, the contents of this memory will be encrypted by the hypervisor and stored in main memory, or on disk (e.g., when a VM is shut down, or when a snapshot of the VM is taken). Thus, when the information is selected for storage in the NVRAM, it is encrypted by the hypervisor prior to storage. And when the encrypted information is selected for recall by the VM or other subsidiary elements in the system (e.g., an application executing under the VM), it is decrypted by the hypervisor prior to presentation to these other elements. For example, if application A has been allocated the memory space in the range of addresses 0000H to 1000H as encrypted memory, when the application A wants to access the memory, it approaches the operating system (OS), which in turn goes to the VM, and then the VM goes to the hypervisor, which actually retrieves and decrypts the information stored in the encrypted memory.

Thus, the OS can be modified to map the encrypted memory to a range of locations, and to grant access to these special memory locations upon request from application programs. This can be implemented by using the OS to expose the encrypted memory using an application interface (API). In this way, the API is used by the OS to access the memory. The OS can also be used to prevent any other application, other than those specifically authorized, from accessing the secure memory. The OS is visible to the VM in this case, but is also in communication with the hypervisor, which actually give the memory space to the OS to use.

Special system calls or APIs are provided which applications running on the VMs can use to push secrets to the encrypted memory. In this way, regular memory access calls result in access to regular memory. Secure memory access requests result in access to the encrypted memory if this feature has been authorized by the OS. In essence, this is software lock that can be implemented on any physical machine—no proprietary hardware is needed.

The OS can also be modified to prevent debugger programs and core dump routines from accessing the encrypted memory. The OS can tell the difference between a debugger or core dump program (or programs like them, which are not allowed to access encrypted memory), and other programs that are permitted to access the encrypted memory, because the OS has knowledge of which memory locations in the encrypted memory (if any) have been allocated to each application. In this way, secure data is specific to a single application. Applications can share data in normal memory, but not normally within the encrypted locations.

If the VM that has been permitted access to encrypted memory is migrated to a physical machine, then in most embodiments the encrypted memory locations can still be accessed as valid locations, so that applications will continue to execute, but there may not be any encryption of the information stored in those locations. This is because migration attempts to move all memory from one machine (e.g., a VM) to another (e.g., physical machine). The hypervisor access both regular and encrypted memory, decrypts the information in the encrypted memory, and assembles a memory file that comprises the content from the regular memory, and the unencrypted information from the encrypted memory. This file is then passed to the physical machine (or another hypervisor), perhaps over a secure network connection. The physical machine (or new hypervisor) can now take over management (e.g., encryption) of the unencrypted information, so that it can be processed in a secure manner by the new host.

There are many ways of configuring the encrypted memory file. One approach is to make the VM aware of the existence of the encrypted memory configuration as a disk file. Another approach involves making the OS aware of the encrypted memory presence, without giving the VM the encrypted memory configuration.

In the first configuration that can be used to manage encrypted memory, the encrypted memory file can be exposed as a disk to the VM by the hypervisor. The VM knows about the existence of this special disk as encrypted memory. The disk can be mounted, and the files on the disk are mapped to special memory locations (e.g., the UNIX® "mmap" system call can be used to establish a mapping inside the OS between the address space of a process and a file) which are designated as encrypted memory. At this point, the encrypted memory can be allocated to various applications by the OS. That is, in this first configuration option, the VM manages storing the unencrypted information to the disk, and the hypervisor gives the memory configuration to the VM (while the hypervisor keeps the encryption key). This permits the hypervisor to make the VM aware of the existence of the encrypted memory as a disk file. The VM in turn can then expose the encrypted memory as a secure disk file to various applications running on the VM. These applications include the OS, which manages the memory for the VM. In this configuration, an observer outside the VM would be able to locate the secure memory on disk by reviewing the VM configuration. However, from within the VM, it is only known that the hypervisor gives a memory block to the VM, so that while the hypervisor knows the location of the memory, the VM does not know the precise location of the encrypted memory; the memory given by the hypervisor to the VM simply appears to the VM as a disk.

Upon pausing, suspending, or taking a snapshot of VM operations, the hypervisor can be used to restore the encrypted memory to the VM at a later time. This can be useful in many circumstances.

For example, consider the situation where a first password is created on Monday, which is used to log into the system just prior to taking a first snapshot, and then a second password is created on Tuesday, which is used to log into the system just prior to taking a second snapshot. If the system administrator opts to restore the system state as of Monday, it is necessary to recall the password used on Monday. On the other hand, if the system administrator opts to restore the system state as of Tuesday, it is necessary to recall the password used on Tuesday. The various embodiments described herein permit this kind of operation, such that either of the passwords can be recalled in a secure fashion, vastly reducing the opportunity for unauthorized access to the passwords while they exist in a stored snapshot state. Thus, users can access any of the original states of the VM without concern for security of the files that may be exposed to hackers and other unauthorized personnel in the mean time.

When a snapshot is taken, the hypervisor is used to take a picture of all memory, including that which is encrypted by the hypervisor—this is the "encrypted memory." An encryption key can be created when the associated VM is created (e.g., a static key that is used throughout the lifetime of the associated VM), as well as at each time a snapshot is taken (e.g., a dynamic key, that changes each time a snapshot is taken). When the snapshot memory space is restored, this includes the encrypted portion that can be accessed by the VM.

In the second configuration that can be used to manage encrypted memory, the hypervisor manages storing the data selected for secure access, as well as the key(s) used for encryption/decryption, and the VM is not given the configuration of the encrypted memory as a disk file. Instead, the OS executing on the VM is directly aware of the existence of the encrypted memory as a set of protected memory locations (e.g., RAM or NVRAM). That is, the encrypted memory exists as agreed upon memory locations that are known to the OS and mapped by the hypervisor to, for example, an NVRAM file. As a matter of contrast with the first configuration, an observer outside the VM in this case would not know which memory on a disk is allocated to which VM. So while the first configuration may be easier to manage, it is less secure. In the second configuration, the hypervisor does not let the VM know where and how the memory is secured, which offers greater protection, but is less easy to manage.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

FIG. 1 is a flow diagram illustrating methods 111 of securing access to VM memory according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when executed by a specific machine, operate to perform the processing depicted in FIG. 1. Given this context, secure VM memory is now discussed with reference to FIG. 1.

In some embodiments, a processor-implemented method 111 that can be executed on one or more processors that perform the method may operate to provide the functions described above, from the perspective of the hypervisor and/or the VM. The "encrypted memory locations" are defined as memory locations that have been set aside to store information that has been encrypted, which can be designated in some embodiments, as an "NVRAM" file in either main memory, or on disk. A single hypervisor encrypts the information just prior to storage in the encrypted memory locations. The encrypted information stored in the encrypted memory locations is decrypted by the same hypervisor to recover the original information. Decryption occurs in response to a valid request for the information (which is valid only when presented by the associated VM and a single application), prior to presenting the decrypted information to the requesting application. Thus, the method 111 may begin at block 121 with allocating encrypted memory locations to store encrypted information, where the information is to be encrypted and decrypted using a single hypervisor.

If the first configuration described above is used to manage the encrypted memory, the associated VM operates to manage data storage according to a configuration provided to it by the hypervisor. Here, an observer of the VM might be able to locate the memory on disk, but would not be able to decrypt it, as the hypervisor has the only key(s). Thus, the method 111 may continue on to block 125 with presenting the encrypted memory locations by the hypervisor to the associated VM as a secure disk file memory configuration, wherein the associated VM is to manage storage operations associated with secure disk file memory.

After the encrypted memory file is exposed as a disk to the VM by the hypervisor, the system may operate in a variety of ways. For example, the method 111 may continue on to block 129 with mounting a secure disk containing the secure disk file by the associated VM, mapping memory in the secure disk file to a designated number of the encrypted memory locations, and granting access to the secure disk file to a single application by the associated VM.

At block 133, the method 111 may comprise determining whether a request to access specific locations (e.g., a designated number of locations) in the encrypted memory has originated from the correct VM (i.e., the associated VM that received the memory configuration from the hypervisor), and the correct application (i.e., the application which was originally granted access to those specific locations by the associated VM). If the identity of the VM or the application is incorrect, the method 111 may continue on to block 137 with denying access to the designated number of the encrypted memory locations to any other application executed by the associated VM, or any other VM (i.e., any VM that is not the correct VM, and any application which is not the correct application).

If the identity of both the VM and the application is correct, the method 111 may continue on to block 141 with permitting access to the designated number of encrypted memory locations—to a single application executed by the associated VM, subject to the hypervisor. Such access may be permitted using memory allocation techniques known to those of ordinary skill in the art.

The request to access secure memory should be made using a format designated by the VM, or else it can be denied. Thus, the activity at block 141 may comprise permitting access when the single application requests access using a secure memory request designated by the associated VM.

The single application can be any one of a number of applications. These include, but are not limited to word processing applications, presentation applications, spreadsheet applications, email applications, database applications, and/or browser applications.

As noted previously, the encrypted memory locations can be can be copied as part of a snapshot, or as a result of pause/suspend commands. In each case, the hypervisor can operate to dump the VM memory to a disk. Thus, the method 111 may include, at block 145, storing the encrypted information in encrypted memory locations that comprise non-volatile memory locations.

If desired, the stored state of the VM can be restored, including information stored in encrypted form, to be decrypted by the hypervisor. The information stored in the encrypted memory can also be migrated to another host, in encrypted form with a shared key (or keys); or in unencrypted form, over a secure network. Thus, the method 111 may include, at block 149, one of transmitting the encrypted information and at least one shared key to a new hypervisor, or transmitting a decrypted version of the encrypted information to the new hypervisor over a secure network connection.

The encrypted information can also be decrypted and migrated to a physical machine, where the VM memory locations remain valid, with or without encryption. As part of VM migration, memory can be dumped to disk and copied to another host (e.g., a new host on which another VM can be executed). When migration occurs, the old and new hosts can share the encryption/decryption key, perhaps using public and private key logic, so that the data can be sent from the old host to the new host in encrypted format. Or the data can be sent over a secured network, without key sharing between the hosts, in unencrypted format. Thus, the activity at block 149 may comprise decrypting the encrypted information to provide the information as unencrypted information, assembling a memory file comprising the content of regular memory associated with the single application and the unencrypted information, and migrating the assembled memory file to a physical machine to permit unencrypted access to the information by the physical machine. Other embodiments may be realized.

Figure 2:
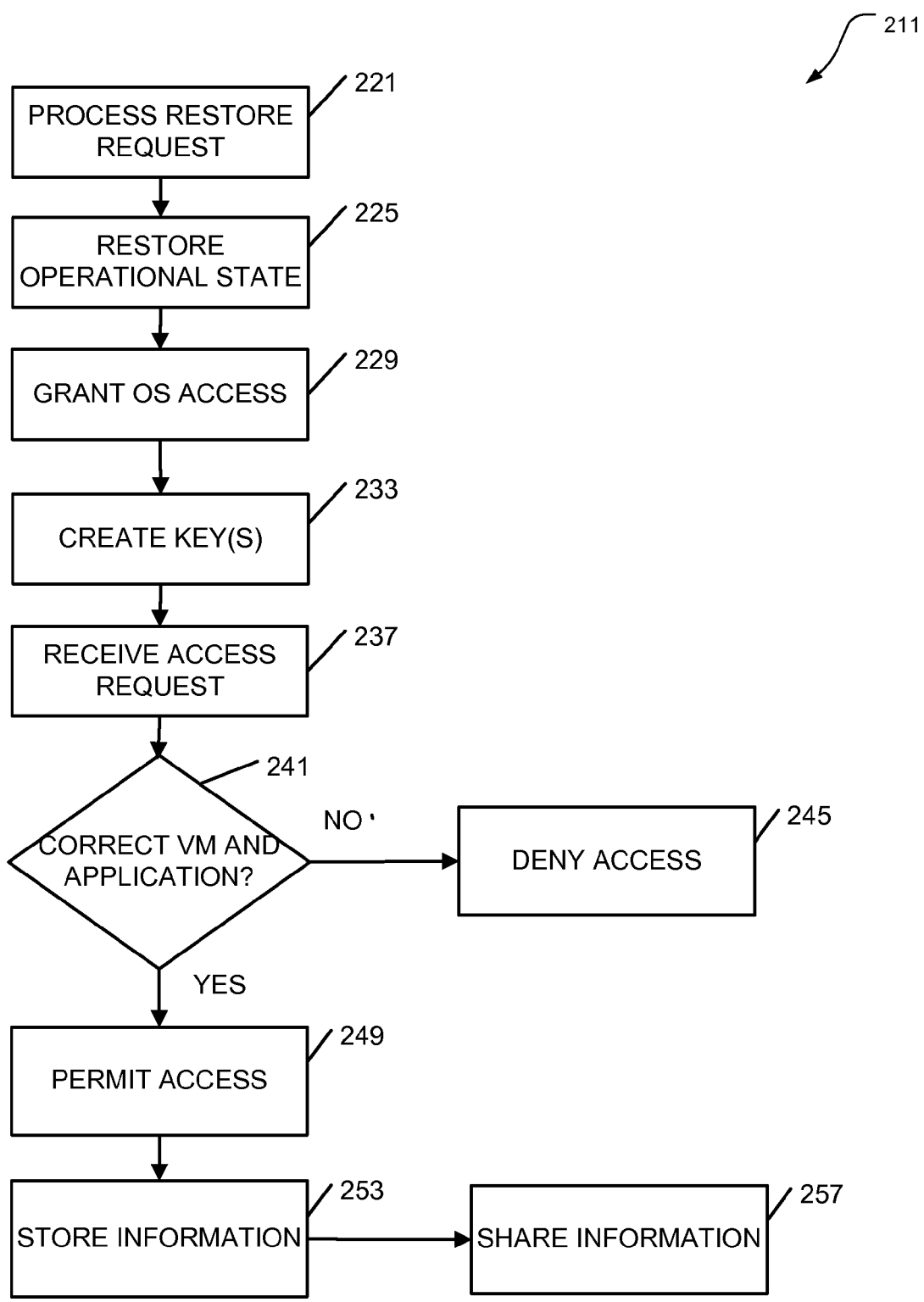
FIG. 2 is a flow diagram illustrating additional methods of securing access to virtual machine memory according to various embodiments of the invention.

For example, FIG. 2 is a flow diagram illustrating additional methods 211 of securing access to virtual machine memory according to various embodiments of the invention. In this case, the methods 211 include alternative and additional activities that can be used to make up hypervisor and VM operations with respect to recovery of the VM operational state (e.g., after operation of the VM is paused or suspended).

The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIG. 2.

It is therefore noted that upon request, after a pause or suspend command has been executed within the virtual environment, the hypervisor can operate to decrypt the encrypted information and use it to restore the operational state of the VM. Thus, the method 211 may begin by including, at block 221, receiving a request to restore the operational state of the associated VM after a pause operation or a suspend operation, and then decrypting, by the hypervisor, the encrypted information to provide the unencrypted information. This information can be transmitted as needed to various system entities and used to restore the operating state of the associated VM.

The method 211 may continue on the block 225 with restoring the operational state of the associated VM, using the encrypted information stored in the encrypted memory locations, where the information is to be encrypted and decrypted using a single hypervisor.

If the second configuration described previously is used to manage the encrypted memory, then the hypervisor manages storage and recall from the encrypted memory locations, and the VM is not given the memory configuration. That is, the hypervisor does not let the VM know where and how the memory is secured. An observer of the VM thus would not be able to locate the secure memory on disk (as well as not being able to decrypt it even if accidentally discovering the memory location). Thus, the method 211 may continue on to include, at block 229, granting access by the hypervisor to an OS associated with the associated VM, to a designated number of the encrypted memory locations, without transmitting the configuration of the encrypted memory locations to the associated VM.

Decryption keys can be static—created for the lifetime of the VM, or dynamic—created each time a snapshot of the VM is taken. Thus, the method 211 may continue on to block 233 with creating, by the hypervisor, a decryption key associated with the information (to be stored in the encrypted memory) once for the lifetime of the VM, or for some number of times that is approximately equal to the number of snapshots taken of the VM.

If an unknown application (e.g., a core dump application, or a debugger application) attempts to access the secure memory, it will be denied by the VM. Thus, the method 211 may continue on to block 237 with receiving a request to access the encrypted memory locations from an unknown application that is not the single application, or an unknown VM that is not associated with the single application, and when the application is unknown by the associated VM, for example, denying access to the unknown application by the associated VM at block 245. That is, access is denied to any other application executed by the associated VM, or any other VM (that is not the associated VM).

However, if the correct VM and application request access to the encrypted memory, then the method 211 may continue on to block 249 with permitting access to the designated number of the encrypted memory locations (but only to the single application executed by the associated VM) subject to the hypervisor.

Once the information is provided by the application, it can be stored in the encrypted memory. Thus, the method 211 may continue on to block 253 with requesting storage of the information by the single application, encrypting the information (by the hypervisor) to provide the encrypted information, and storing the encrypted information in the encrypted memory locations by the hypervisor.

Once the information is stored in the encrypted memory, it can be recovered by the single application. It can be shared with other applications thereafter (as permitted by the single application). Thus, when the information is to be shared between the single application and another application, the method 211 may continue on to block 257 with requesting recall of the information by the single application, decrypting of the encrypted information by the hypervisor to provide the information, and transmitting the information from the hypervisor to the single application—where it can be released and shared with other applications.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of secure virtual machine memory shown in FIGS. 1 and 2 can be implemented in various devices, as well as in a computer-readable storage medium, where the methods are adapted to be executed by one or more processors. Further details of such embodiments will now be described.

Figure 3:
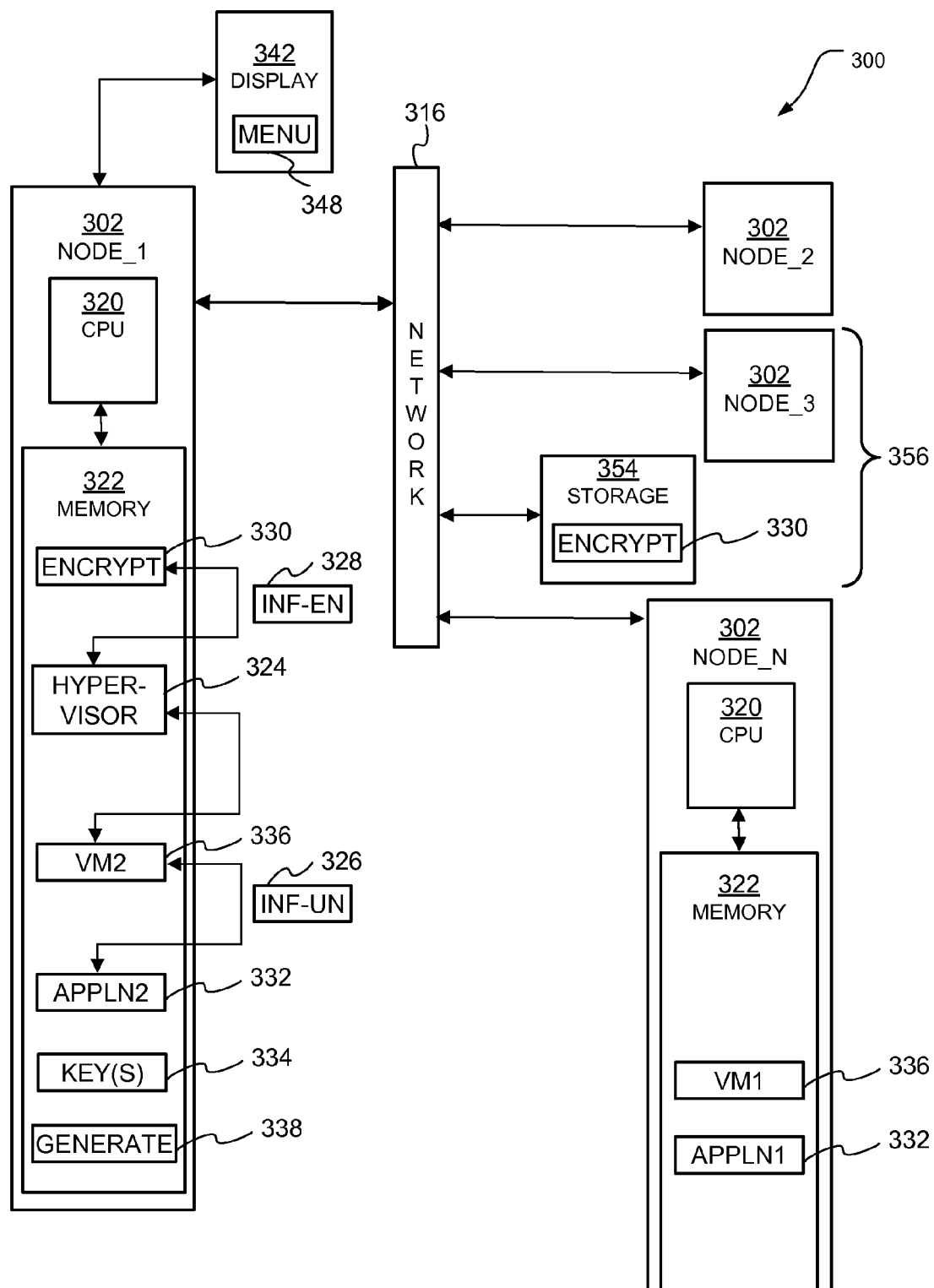
FIG. 3 is a block diagram of apparatus and systems according to various embodiments of the invention.

FIG. 3 is a block diagram of apparatus 300 and systems according to various embodiments of the invention. Here it can be seen that an apparatus 300 used to secure VM memory may comprise one or more processing nodes 302, one or more processors 320, multiple memories 322, and a display 342. The apparatus 300 may comprise a client, a server, or some other networked processing node.

The processing nodes 302 may comprise physical machines or VMs, or a mixture of both. The nodes 302 may also comprise networked entities, such as servers and/or clients. In some basic implementations, the operations described can occur entirely within a single node 302. The apparatus 300 may thus comprise a single desktop computer or server, for example, on which the hypervisor 324 operates, or a number of networked nodes 302.

In some embodiments, then, an apparatus 300 may comprise a first node (e.g., NODE_1) including encrypted memory locations 330 that have been allocated to store encrypted information 328. The apparatus 300 may also comprise a storage supervision processor 320 executing a single hypervisor 324 (among one or more hypervisors). The processor 320 may be communicatively coupled to the first node (including residing within the node, as shown in FIG. 3) to permit access to a designated number of the encrypted memory locations 330 to a single application (e.g., APPLN2) executed by an associated VM (e.g., VM2), subject to the hypervisor 324. The process 320 may be used to deny access to the designated number of the encrypted memory locations to any other application executed by the associated VM, or any other VM (e.g., APPLN1). The unencrypted information 326 may be encrypted and decrypted using the single hypervisor 324.

The VM (e.g., VM2) and application (e.g., APPLN2) may execute on the same node (e.g., NODE_1) as the hypervisor 324, or on a node different from the hypervisor (e.g., the hypervisor 324 may operate on NODE_1, allocating the encrypted memory 330 to the VM VM1 and application APPLN1 on NODE_N.

Considering the first configuration, discussed previously, the configuration of the encrypted memory 330 (e.g., in main memory 322 in NODE_1, or as a disk file designated by the hypervisor, perhaps residing on a storage node 354) can be transmitted to the VM 336 by the hypervisor 324 so that the VM 336 can manage storage and recall to a specified memory location within the encrypted memory 330. Thus, the apparatus 300 may comprise a second node (e.g., NODE_N) to execute the single application 332, and to request storage and recall of the information 326 using a memory configuration associated with the encrypted memory locations 330.

Considering the second configuration, discussed previously, the VM 336 and application 332 may also execute on the same node as the hypervisor, or on a node different from the hypervisor. In this case, the VM 336 operates without having the configuration of the secure memory 330, so that the hypervisor alone manages storage and recall to specified memory locations within the encrypted memory 330. Thus, the apparatus 300 may comprise a second node (e.g., NODE_N) with an associated VM (e.g., VM1) to execute the single application (e.g., APPLN1), and to request storage and recall of the information 326 without having a memory configuration associated with the encrypted memory locations 330.

The encrypted memory 330 may be located in one node (e.g., NODE_1, or the storage node 354), and the processor 322 may be located in another node. Thus, the apparatus 300 may comprise a second node (e.g., NODE_N) to house the storage supervision processor 320 (e.g., the processor 320 housed in NODE_N).

The memory used as encrypted memory 330 may comprise physical non-volatile memory. Thus, the encrypted memory locations 330 may comprise non-volatile memory.

Encryption keys 334 can be created for the hypervisor 324 to be used statically, or dynamically. Thus, the apparatus 300 may comprise a key generation module 338 to generate static encryption keys and/or dynamic encryption keys to be made accessible to the single hypervisor 324. As noted previously, the static encryption key can be created once for the lifetime of the associated VM 336, and the dynamic encryption key can be created a number of times, such as approximately equal to the number of snapshots taken of the associated VM 336.

A system that operates to secure VM memory may comprise multiple instances of the apparatus 300. The system might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 342 to show the activities conducted while the node 302 is active. Thus, the system may also comprise a display 342 coupled to the nodes 302 to display visible indications 348 of the activities conducted at the nodes 302.

The apparatus 300 and system may be implemented in a machine-accessible and readable medium that is operational over one or more networks 316. The networks 316 may be wired, wireless, or a combination of wired and wireless. The apparatus 300 and system can be used to implement, among other things, the processing associated with the methods 111 and 211 of FIGS. 1 and 2, respectively. Modules may comprise hardware, software, and firmware, or any combination of these. Additional embodiments may be realized.

Figure 4:
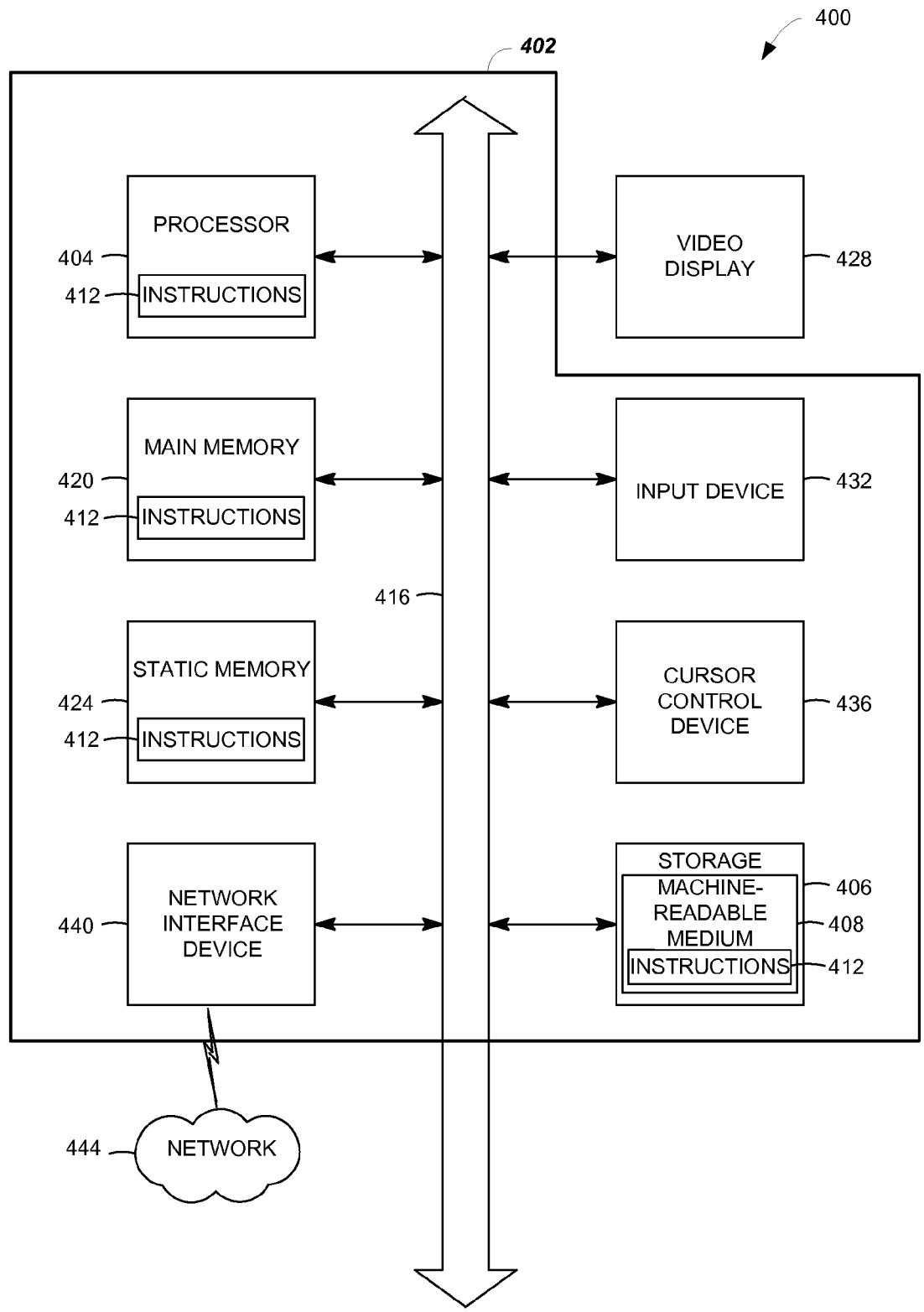
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium"

or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing access to memory in a virtual environment. Various configurations may be employed, depending on the amount of security that is desired. More efficient allocation of processing resources, increased overall system security, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A machine-readable medium that is not a transitory propagating signal, the machine-readable medium including instructions that, when executed by a machine, cause the machine to perform operations comprising:

granting access by a single hypervisor to an operating system (OS) associated with an associated virtual machine (VM), to a designated number of the encrypted memory locations, without transmitting a configuration of the encrypted memory locations to the associated VM;

copying, by the hypervisor, associated VM memory to a file in response to an instruction to snapshot virtual machine memory, clone the associate VM, pause the associated VM, or suspend the associated VM, the associated VM memory including encrypted memory locations, a designated number of the encrypted memory locations assigned to a single application executing in the OS of the associated VM, the encrypted memory locations specified by memory addresses, the encrypted memory locations accessible to the single application via a secure memory access request to the OS using the memory addresses, the copying including encrypting data from the encrypted memory locations prior to storage in the file;

restoring an operational state of application data for the associated VM, using encrypted information of the application data stored in the encrypted memory locations, the information to be encrypted and decrypted using the single hypervisor; and permitting, in response to a request by the single application executed in the OS of the associated VM, access to the designated number of the encrypted memory locations only to the single application executed by the associated VM subject to the hypervisor, wherein the access is denied to any other application executed by the associated VM, or any other VM.

2. The machine-readable medium of claim 1, wherein the operations further comprise:

receiving a request to access the encrypted memory locations from an unknown application that is not the single application, or an unknown VM that is not associated with the single application; and denying access to the unknown application by the associated VM.

3. The machine-readable medium of claim 1, wherein the operations further comprise:

receiving a request to restore the operational state of application data for the associated VM after one of a pause operation or a suspend operation;

decrypting, by the hypervisor, the encrypted information to provide the information; and transmitting the information to be used to restore the operational state of application data for the associated VM.

4. The machine-readable medium of claim 1, wherein the operations further comprise:

creating, by the hypervisor, a decryption key associated with the information once for a lifetime of the VM, or for some number of times equal to a number of snapshots taken of the VM.

5. An apparatus comprising:

a first node including encrypted memory locations specified by memory addresses; and a storage supervision processor to execute a single hypervisor, the storage supervision processor to:

copy associated virtual machine (VM) memory to a file in response to an instruction to snapshot virtual machine memory, clone the associate VM, pause the associated VM, or suspend the associated VM, the associated VM memory including the encrypted memory locations, a designated number of the encrypted memory locations assigned to a single application executing in an operating system (OS) of the associated VM, the encrypted memory locations accessible to the single application via a secure memory access request to the OS using the memory addresses, wherein to copy the associated VM memory includes encrypting data from the encrypted memory locations prior to storage in the file restore an operational state of application data for the associated VM using encrypted information of the application data stored in the encrypted memory locations;

permit, in response to a request by the single application executed in an operating system of the associated VM, access to the designated number of the encrypted memory locations only to the single application executed by the associated VM on a second node subject to the hypervisor, wherein the access is denied to any other application executed by the associated VM, or any other VM; and grant access to the OS associated with the associated VM, to a designated number of the encrypted memory locations, without transmitting a configuration of the encrypted memory locations to the associated VM.

6. The apparatus of claim 5, wherein the apparatus is to:

receive a request to access the encrypted memory locations from an unknown application that is not the single application, or an unknown VM that is not associated with the single application; and deny access to the unknown application by the associated VM.

7. The apparatus of claim 5, wherein the apparatus is to:

receive a request to restore the operational state of the application data for the associated VM after one of a pause operation or a suspend operation;

decrypt, by the hypervisor, the encrypted information to provide the information; and transmit the information to be used to restore the operational state application data for of the associated VM.

8. The apparatus of claim 5, wherein the hypervisor is to create a decryption key associated with the information once for a lifetime of the VM, or for some number of times equal to a number of snapshots taken of the VM.

9. A processor-implemented method to execute on one or more processors that perform the method, comprising:

granting access by a single hypervisor to an operating system (OS) associated with an associated virtual machine (VM), to a designated number of the encrypted memory locations, without transmitting a configuration of the encrypted memory locations to the associated VM;

copying, by the hypervisor, associated VM memory to a file in response to an instruction to snapshot virtual machine memory, clone the associate VM, pause the associated VM, or suspend the associated VM, the associated VM memory including encrypted memory locations, a designated number of the encrypted memory locations assigned to a single application executing in the OS of the associated VM, the encrypted memory locations specified by memory addresses, the encrypted memory locations accessible to the single application via a secure memory access request to the OS using the memory addresses, the copying including encrypting data from the encrypted memory locations prior to storage in the file;

restoring an operational state of application data for the associated VM, using encrypted information of the application data stored in the encrypted memory locations, the information to be encrypted and decrypted using the single hypervisor; and permitting, in response to a request by the single application executed in the OS of the associated VM, access to the designated number of the encrypted memory locations only to the single application executed by the associated VM subject to the hypervisor, wherein the access is denied to any other application executed by the associated VM, or any other VM.

10. The method of claim 9, further comprising:

receiving a request to access the encrypted memory locations from an unknown application that is not the single application, or an unknown VM that is not associated with the single application; and denying access to the unknown application by the associated VM.

11. The method of claim 9, further comprising:

receiving a request to restore the operational state of the application data for the associated VM after one of a pause operation or a suspend operation;

decrypting, by the hypervisor, the encrypted information to provide the information; and transmitting the information to be used to restore the operational state of the associated VM.

12. The method of claim 9, further comprising:

creating, by the hypervisor, a decryption key associated with the information once for a lifetime of the VM, or for some number of times equal to a number of snapshots taken of the VM.

\* \* \* \* \*